(12) United States Patent
Walser et al.

(10) Patent No.: US 11,932,049 B2
(45) Date of Patent: Mar. 19, 2024

(54) FLEXIBLE ADAPTER AND RIM ASSEMBLY FOR A ROLLING ASSEMBLY

(71) Applicant: Maxion Wheels Holding GmbH, Königswinter (DE)

(72) Inventors: Daniel Walser, Clermont-Ferrand (FR); Johan Vits, Boechout (BE); Bertrand Vedy, Clermont-Ferrand (FR)

(73) Assignee: MAXION WHEELS HOLDING GMBH, Königswinter (DE)

( * ) Notice: Subject to any disclaimer, the term of this patent is extended or adjusted under 35 U.S.C. 154(b) by 376 days.

(21) Appl. No.: 16/973,275

(22) PCT Filed: Jun. 7, 2019

(86) PCT No.: PCT/FR2019/051381
§ 371 (c)(1),
(2) Date: Dec. 8, 2020

(87) PCT Pub. No.: WO2019/234370
PCT Pub. Date: Dec. 12, 2019

(65) Prior Publication Data
US 2021/0245546 A1 Aug. 12, 2021

(30) Foreign Application Priority Data
Jun. 8, 2018 (FR) ...................... 1855038

(51) Int. Cl.
*B60B 21/10* (2006.01)
*B60B 21/12* (2006.01)
(Continued)

(52) U.S. Cl.
CPC ............ *B60B 21/10* (2013.01); *B60B 21/125* (2013.01); *B60B 25/045* (2013.01); *B60B 25/12* (2013.01)

(58) Field of Classification Search
CPC ..... B60B 21/10; B60B 21/102; B60B 21/104; B60B 21/108; B60B 25/04; B60B 25/045;
(Continued)

(56) References Cited

U.S. PATENT DOCUMENTS 4,373,567 A * 2/1983 Declercq ................. B60C 15/02
152/405
4,878,527 A * 11/1989 Noma ...................... B60B 21/10
301/95.101
(Continued)

FOREIGN PATENT DOCUMENTS

EP 0518098 A1 12/1992
EP 1216850 A1 * 6/2002 ........... B60B 21/023
(Continued)

OTHER PUBLICATIONS

International Search Report dated Oct. 4, 2019, in corresponding PCT/FR2019/051381 (5 pages).

Primary Examiner — S. Joseph Morano
Assistant Examiner — Eva L Comino
(74) Attorney, Agent, or Firm — MacMillan, Sobanski & Todd, LLC

(57) ABSTRACT

Assembly of a rim and of a flexible adapter, intended to make up, with a tyre, a rolling assembly. The rim having a mounting well that is extended axially by a boss, a rim seat and a rim flange that extends the rim seat axially on the outside, with a bearing face of substantially radial orientation. The adapter having an axially inner end intended to rest on the rim seat, an axially outer end and a substantially cylindrical body that connects the axially inner end and the axially outer end and is intended to receive, in cooperation with the axially outer end, a tyre bead. The rim seat of the rim has an inclination relative to the axis of rotation of between −2 and +6 degrees, the angle being counted as
(Continued)

positive when the virtual vertex of the substantially frusto-conical seat is situated axially on the outside.

8 Claims, 3 Drawing Sheets

(51) Int. Cl.
  *B60B 25/04* (2006.01)
  *B60B 25/12* (2006.01)
(58) Field of Classification Search
  CPC ....... B60B 25/08; B60B 25/10; B60B 21/125; B60B 21/028
  See application file for complete search history.

(56) References Cited

U.S. PATENT DOCUMENTS

| | | | |
|---|---|---|---|
| 5,232,033 A | 8/1993 | Durif | |
| 5,749,982 A * | 5/1998 | Muhlhoff | B60B 21/10 152/158 |
| 6,626,217 B2 * | 9/2003 | Bestgen | B60B 25/18 152/381.4 |
| 10,189,316 B2 * | 1/2019 | Daval | B60C 15/02 |
| 10,328,752 B2 * | 6/2019 | Topin | B60C 15/02 |
| 10,369,849 B2 * | 8/2019 | Ahouanto | B60C 15/0206 |
| 10,414,208 B2 * | 9/2019 | Merino Lopez | B60B 25/14 |
| 10,562,348 B2 | 2/2020 | Ahouanto et al. | |
| 10,639,930 B2 * | 5/2020 | Brame | B60B 21/028 |
| 2002/0088520 A1 | 7/2002 | Bestgen | |
| 2016/0311255 A1 | 10/2016 | Ahouanto et al. | |
| 2017/0291457 A1 | 10/2017 | Topin et al. | |
| 2020/0215850 A1 | 7/2020 | Walser et al. | |
| 2020/0215851 A1 | 7/2020 | Walser et al. | |

FOREIGN PATENT DOCUMENTS

| | | | | |
|---|---|---|---|---|
| FR | 2491836 A1 | | 4/1982 | |
| FR | 3026051 A1 | * | 3/2016 | ........... B60B 21/125 |
| FR | 3054479 | * | 7/2016 | |
| FR | 3052392 A3 | | 12/2017 | |
| WO | WO-9515863 A1 | * | 6/1995 | ............ B60B 21/10 |
| WO | 00/41467 A2 | | 7/2000 | |
| WO | 2015/086662 A1 | | 6/2015 | |
| WO | 2016/046197 A1 | | 3/2016 | |
| WO | 2018/020152 A1 | | 2/2018 | |
| WO | 2019/002792 A1 | | 1/2019 | |

* cited by examiner

FLEXIBLE ADAPTER AND RIM ASSEMBLY FOR A ROLLING ASSEMBLY

FIELD OF THE INVENTION

The subject of the invention is an assembly made up of a rigid rim and a flexible adapter, intended to make up, with a tyre, a rolling assembly. As is known, a tyre comprises two beads intended to be mounted on seats. The present invention relates to rolling assemblies in which a tyre bead is not mounted directly on a rigid rim but is mounted on a flexible adapter, which is mounted on the rim.

A tyre, a rim, and an adapter, as discussed in the present invention, are usually described by a representation in a meridian plane, i.e. a plane containing the axis of rotation of the tyre. All of these products (a tyre, a rim, an adapter) are objects having a geometry exhibiting symmetry of revolution about their axis of rotation. The radial and axial directions denote the directions perpendicular to the axis of rotation of the tyre and parallel to the axis of rotation of the tyre, respectively. In the following text, the expressions "radially" and "axially" mean "in a radial direction", and "in the axial direction", respectively. The expressions "radially inner, respectively radially outer" mean "closer to, respectively further away from, the axis of rotation of the tyre, in a radial direction". A median plane is a plane perpendicular to the axis of rotation of the tyre, positioned axially so as to intersect the surface of the tread substantially midway between the beads of a tyre. The expressions "axially inner, respectively axially outer" mean "closer to, respectively further away from, the median plane of the tyre, in the axial direction". The expressions "radially inner, respectively radially outer" mean "closer to, respectively further away from, the axis of rotation, in the radial direction". Finally, it will also be recalled that a "radial cross section" or "radial section" means a cross section or a section in a plane that contains the axis of rotation of the rim (and of the tyre with which the latter is equipped).

PRIOR ART

The document WO2016/046197 proposes inserting a flexible adapter between a tyre bead and a rim. The reader will refer for example to FIG. 5 of that document in order to learn of a rolling assembly belonging to the field of the invention. A rolling assembly comprising a tyre, a rim and two identical adapters is shown therein. Considering the language conventions recalled above, and with reference to the way in which such an adapter is mounted on a rim, such an adapter comprises, axially from the inside towards the outside, an axially inner end, referred to as "adapter bead", intended to secure the adapter to the rim. Such an adapter also comprises an axially outer end. A body connects the two, respectively axially inner and axially outer, ends. The body cooperates with the axially outer end so as to receive a tyre bead and axially fix it in place.

The adapters are mounted on a rim, which is an aluminium part most of the time. The rim has a mounting well that is extended on each side by a boss, a substantially frustoconical rim seat and a rim flange that is intended in particular to axially fix the adapter bead in place.

In the example presented in this document, the rim flange is of the "B" type, as defined by the ETRTO. The rim seat has an inclination of −5°, the angle being counted as positive when the virtual vertex of the frustum is disposed axially on the outside relative to the rim flange.

Mounting the rolling assembly involves several steps. To start with, the two flexible adapters are disposed on the two rim seats. To do this, the first adapter is introduced into the mounting well of the rim, then the adapter bead is gradually put in place on the rim seat by axially pushing the axially inner end of the adapter until it is completely positioned on the rim seat of the rim. The same is then done for the second adapter. The final part of putting the adapter beads in place can be carried out with a conventional machine for mounting tyres on rims. Finally the tyre is mounted so as to position its two beads against the two axially outer ends of the two adapters, resting on the radially outer face of the two bodies of the flexible adapters.

As in the case of mounting tyres on their rims without the aid of adapters, pressurizing the rolling assemblies has to make it possible to press the beads of the tyres and the inner ends of the flexible adapters against their respective bearing faces.

It has however been noted that the positioning of the adapter beads is not always clearly defined and they are not always fitted identically along their entire perimeters. This results in geometric irregularities. These irregularities make it difficult to rule as to the conformity or non-conformity of the wheel and adapter assemblies before the mounting of the tyres. They may also contribute to vibrations during rolling on account of non-uniformities.

The observations made by the applicant have thus led to a departure from the construction rules for rims.

BRIEF DESCRIPTION OF THE INVENTION

The aim of the present invention is to define a rim for a rolling assembly with a flexible adapter, which has a good guiding capacity while being resistant to kerbing and while ensuring precise and lasting mounting of the adapter on a rim.

The subject of the invention is an assembly of a rim and of a flexible adapter, intended to make up, with a tyre, a rolling assembly, the rim having an axis of rotation DD' and a median plane P. The rim has a mounting well that is extended axially at least on one side of said median plane by a boss, a substantially frustoconical rim seat, and a rim flange that extends the rim seat axially on the outside. The adapter has an axially inner end intended to rest on the rim seat, an axially outer end, and a substantially cylindrical body that connects the axially inner end and the axially outer end and is intended to receive, in cooperation with the axially outer end, a tyre bead. This assembly is characterized in that the substantially frustoconical rim seat of the rim has an inclination $\alpha$ relative to the axis of rotation DD' of between −2 and +6 degrees, the angle $\alpha$ being counted as positive when the virtual vertex S of the substantially frustoconical seat is situated axially on the outside.

The reduction in the inclination of the rim seat limits or even prevents axial movement towards the inside of the rim after mounting of the flexible adapter on the rim. The adapter bead put in place on the entire circumference of the rim seat of the rim thus remains in place; it is locked axially in position against the substantially radial bearing face of the rim flange when this adapter bead rests on the rim seat.

This locking in position against the radial bearing face of the rim flange has the advantage of precisely defining the position of this inner end or adapter bead of the flexible adapter as soon as it is mounted on the rim without having to count on the pressurization of the rolling assembly. This makes it possible to very substantially improve the quality of the mounting of the rolling assembly by reducing the geometric position irregularities and the associated parasitic vibrations during running.

According to a preferential embodiment, the rim seat has an inclination α of between +4 and +6 degrees.

This inclination of the rim seat has the advantage of opposing any inward axial movement of the adapter bead of the adapter during mounting thereof, and thereafter.

According to another preferential embodiment, the rim seat is substantially cylindrical.

According to an additional embodiment, the axial width between the radial bearing face of the rim flange and the circle of maximum diameter of the boss of the rim is less than 17 mm, and preferably between 15 and 16 mm.

This has the advantage of making it difficult to mount a tyre bead on one of the rim seats of the rim also on account of the visual appearance that is very different to the conventional case.

According to a preferential embodiment, the axial width of the substantially frustoconical rim seat is smaller than the axial width of the inner end of the flexible adapter, which width is measured when the adapter is free.

This axial width that is smaller than the current embodiments of rim seats makes it possible to guarantee that when the axially inner end of the adapter is put in place in the volume of the rim seat between the radial face of the rim flange and the boss, this position is unique and can no longer move.

According to an advantageous embodiment, the radially inner face of the inner end of the flexible adapter has a frustoconical portion with an axial width smaller than the axial width of the rim seat of the rim and with an inclination similar to that of the rim seat of the rim.

This has the advantage of making it easier to correctly and definitively put the adapter bead in place on the rim seat of the rim.

Each adapter is flexible; this is understood to mean that it is elastically deformable, allowing, as seen in meridian cross section, bending and radial movement while remaining within the elastic region, under service stress loadings, during the use of the tyre inflated to nominal pressure. It should be noted that the axial deformation of the adapter is practically negligible during normal operation of the tyre inflated to nominal pressure.

The rim is preferably made of a material selected from steel or alloys of aluminium and/or of magnesium, composite materials based on carbon fibres, glass fibres, aramid fibres, plant fibres, said fibres being contained in a matrix based on thermosetting compounds or on thermoplastic compounds, or of a complex compound comprising an elastomer and a complex based on resin and fibres selected from carbon fibres, glass fibres, aramid fibres, plant fibres or from any combination of materials.

As regards other aspects of the rim per se or of the adapter per se, the reader is referred to the abovementioned documents WO2015/086662 and WO2016/046197.

DESCRIPTION OF THE FIGURES

The invention is described below with reference to FIGS. 1 to 5, which are given merely by way of illustration.

DETAILED DESCRIPTION OF THE INVENTION

Figure 1:
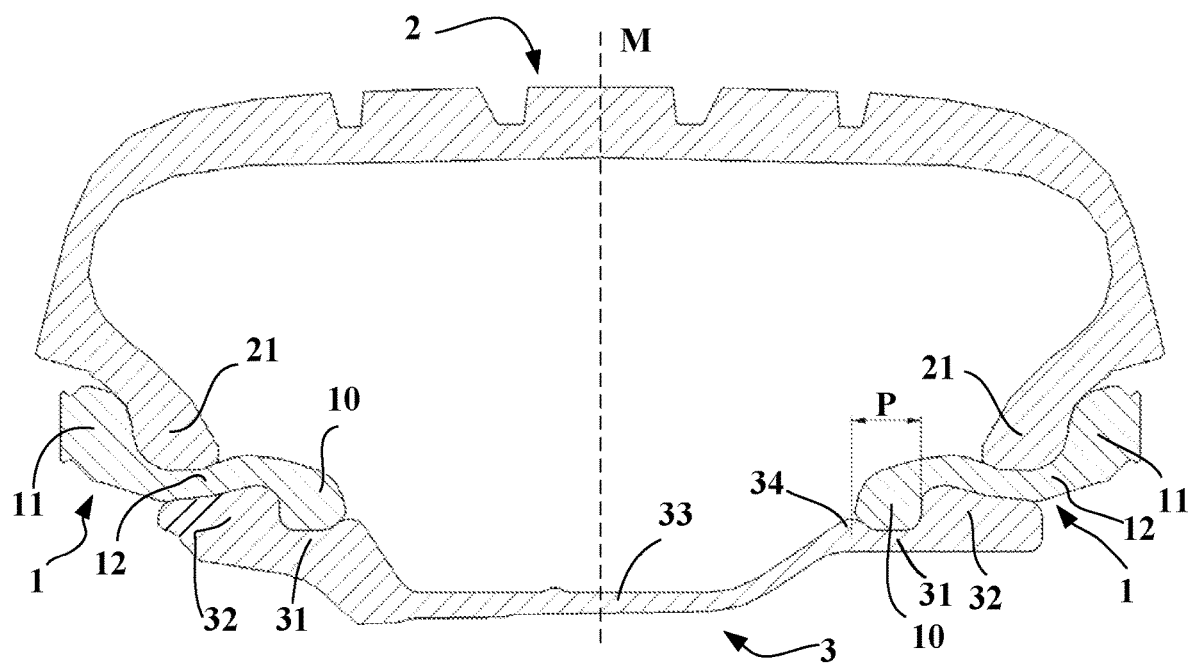
FIG. 1 is a meridian cross section through a rolling assembly with a rim and flexible adapter assembly according to the invention.

FIG. 1 shows a rolling assembly according to the invention. This assembly comprises two identical adapters 1, a tyre 2 and a rim 3. The tyre 2 has two beads 21. Generally, let it be noted that the choice of rim width is such that, given the width L of the adapters (see FIG. 3), the tyre is in a configuration that is as similar as possible to the configuration it would have if it were mounted directly, without adapters, on an appropriate rim. The rim 3 has a mounting well 33, extended on either side of the median plane M by two bosses 34, two rim seats 31, each extended by a rim flange 32. Each adapter 1 has an inner end or adapter bead 10, an outer end 11 and a body 12 connecting the two ends 10 and 11.

In the following text, "rim seat" and "rim flange" refer to the radially outer face of the zone 31 of the rim seat and of the zone 32 of the rim flange and to these zones 31 and 32.

Figure 2:
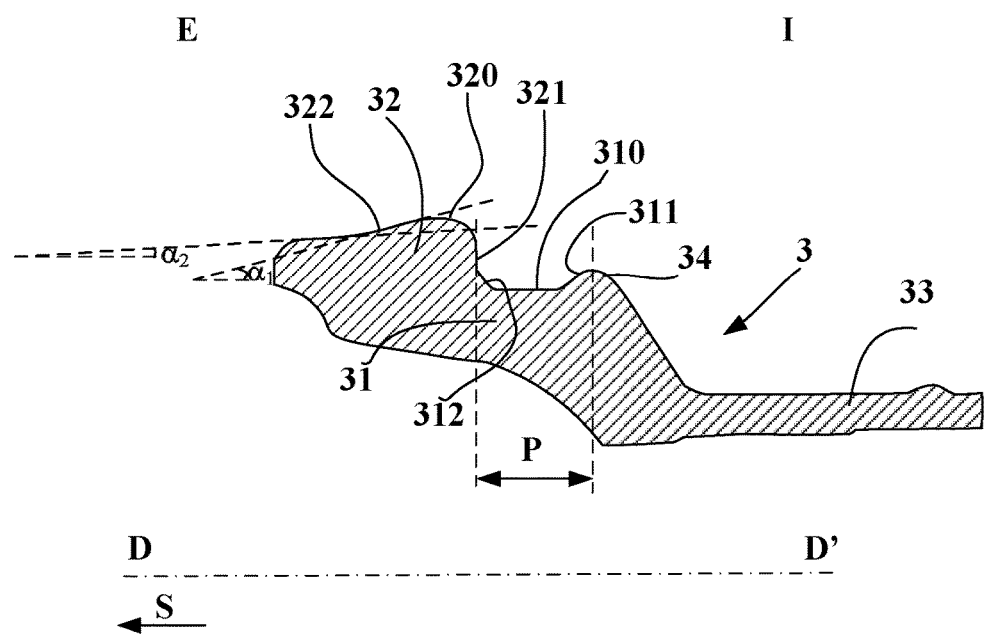
FIG. 2 presents a partial meridian cross section through a rim according to the invention.

By consulting more particularly FIG. 2, the rim seat 31 has a substantially cylindrical portion 310 that is extended axially on the inside by a connection zone 311 with the boss 34 and axially on the outside by a connection zone 312 with the rim flange 32. The axial width of the rim seat P, including the two connection zones 311 and 312 is 15.3 mm. This rim seat is appreciably narrower than conventional rim seats, of which the axial width is at least 19.5 mm for rims with a width greater than 4.5 inches, this makes possible mounting of a tyre directly on the rim 3 difficult. The rim flange 32 has a first portion 321 oriented substantially in a plane perpendicular to the axis of rotation DD' of the rolling assembly and situated radially on the outside relative to said rim seat 31. The rim flange 32 has a second, substantially frustoconical portion 322, which is situated axially on the outside relative to said first portion 321 and situated at least in part radially on the outside relative to said rim seat 31, said second portion 322 being substantially frustoconical. In the exemplary embodiment presented, this second portion comprises two frustoconical portions, the first with an angle $\alpha_1$ of 15° followed axially on the outside by the second with an angle $\alpha_2$ of 5°. The rim also has a connection portion 320 between said first portion 321 and said second portion 322. The axial width WR of the flange 32 is 18.3 mm.

The references E and I in FIG. 2 indicate the axially outer side and the axially inner side of the rim, respectively. The second portion 322 is inclined axially towards the outside: thus, by extending it axially towards the outside, it meets the axis DD' (position not to scale relative to the rim 3) at a virtual vertex S located axially very far towards the outside, this being symbolized by an arrow under S in FIG. 2.

The invention can be used with numerous variants of internal makeup of the tyre 2, which are therefore not shown, and with numerous variants of internal makeup of the adapter 1, which are therefore not shown.

Figure 3:
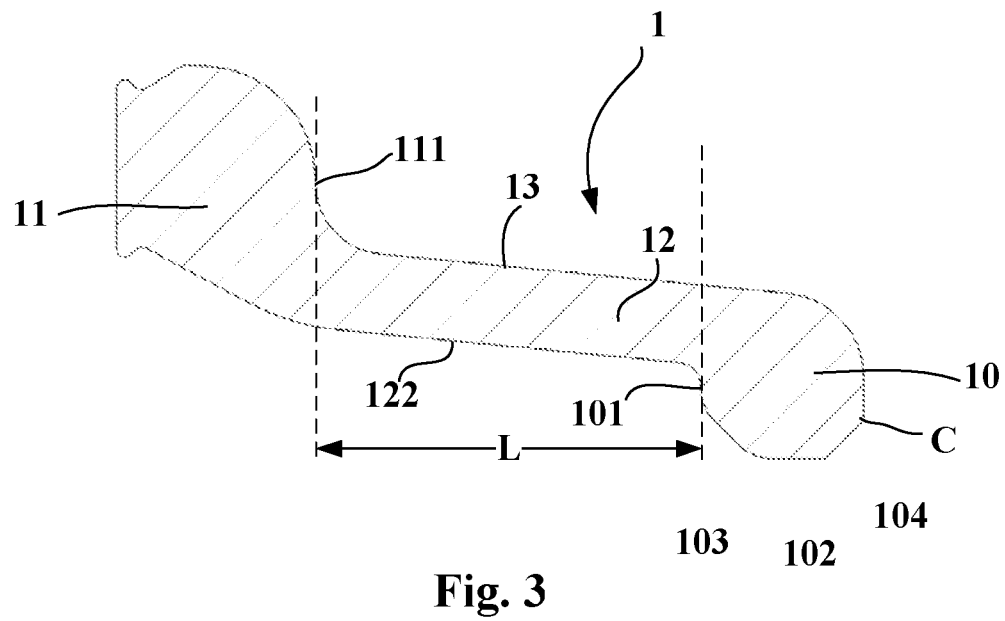
FIG. 3 presents a cross section through a flexible adapter according to the invention, in the free state.

Returning to FIG. 3, it can be seen that each adapter 1 has an axially inner end 10 intended to be mounted on one of said rim seats 31. It has an axially outer end 11 and a body 12 that is oriented substantially axially and disposed between said axially outer end 11 and said axially inner end 10. The body 12 has a radially inner face 122. The axially inner end 10 of the adapter has an axial positioning face 101 substantially perpendicular to the axis of rotation DD', a substantially cylindrical radial positioning face 102 with an axial width smaller than the axial width of the cylindrical rim seat 31. The radial positioning face 102 is extended on both sides by connecting faces 103 and 104 that extend radially and axially as far as the axial positioning face 101, on the outer side, and as far as the point C, the inner axial end of the adapter bead, on the inner side. The axially outer end 11 has a shoulder 111 forming in part a face substantially perpendicular to the axis of rotation DD'. Said adapter 1 has an adapter seat 13. In FIG. 3, the adapter 1 is as it was at the end of curing and the body 12 is substantially cylindrical. L, the width of the adapter, is intended to mean the axial distance between the axial positioning face 101 of the adapter bead 10 that is intended to be pressed axially against the radial face 321 of the flange 32 of the rim and the shoulder 111, which is also radial, intended to axially lock the bead 21 of the tyre 2. The distance 2xL corresponds substantially to the reduction in width of the rim 3 relative to a conventional rim for the tyre 2 in question.

Figure 4:
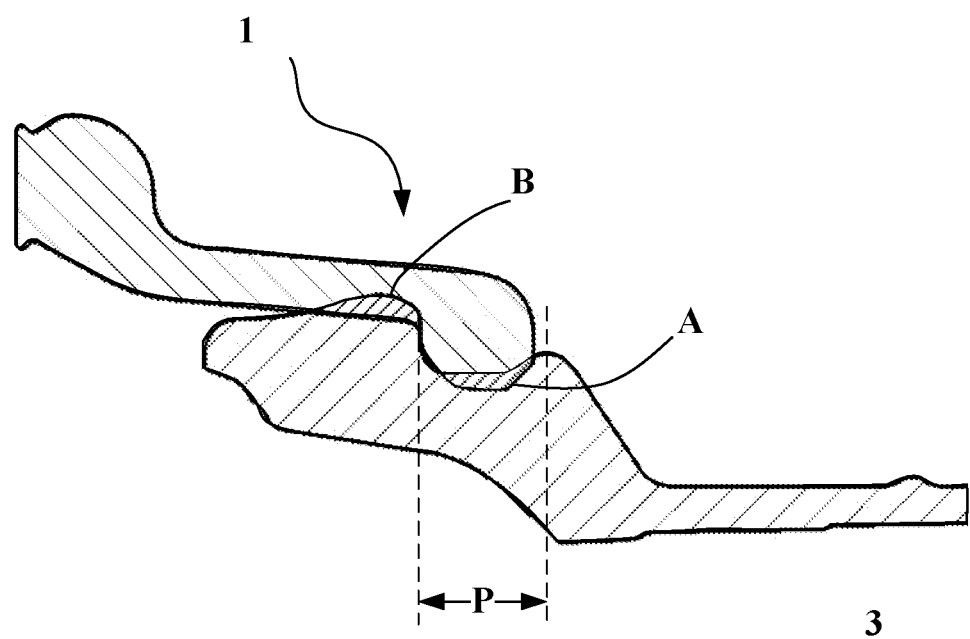
FIG. 4 is a partial meridian cross section in which the cross section through a flexible adapter in the free state is superposed on that of a rim.

FIG. 4 shows the superposition of an adapter 1 in the free state as shown in FIG. 3 and of a seat and a rim flange as are shown in FIG. 2. This figure has the advantage of showing the two zones A and B of interference between the adapter and the rim. In zone A, it can be seen that the radial positioning face 102 undergoes a high contraction during mounting thereof on the rim seat, and this presses the axial positioning face 101 of the adapter against the bearing face 321 of the rim flange 32. Consequently, once it has been put in place on the rim seat 31, the adapter bead 10 is in its definitive position and can no longer move axially, and is in its definitive working position. It is thus no longer necessary to count on the inflation pressure to put the adapter bead in place on the rim seat, and this guarantees a substantial reduction in the defects of uniformity of the rolling assembly. This also makes it possible to rule as to the conformity or non-conformity of the wheel/adapter assemblies from a geometric point of view before the mounting of the tyres.

In zone B, the body 12 of the adapter wraps around the rim flange so as to form a boss that is comparable to and has the same functionality as the bosses or "humps" of conventional rims.

Figure 5:
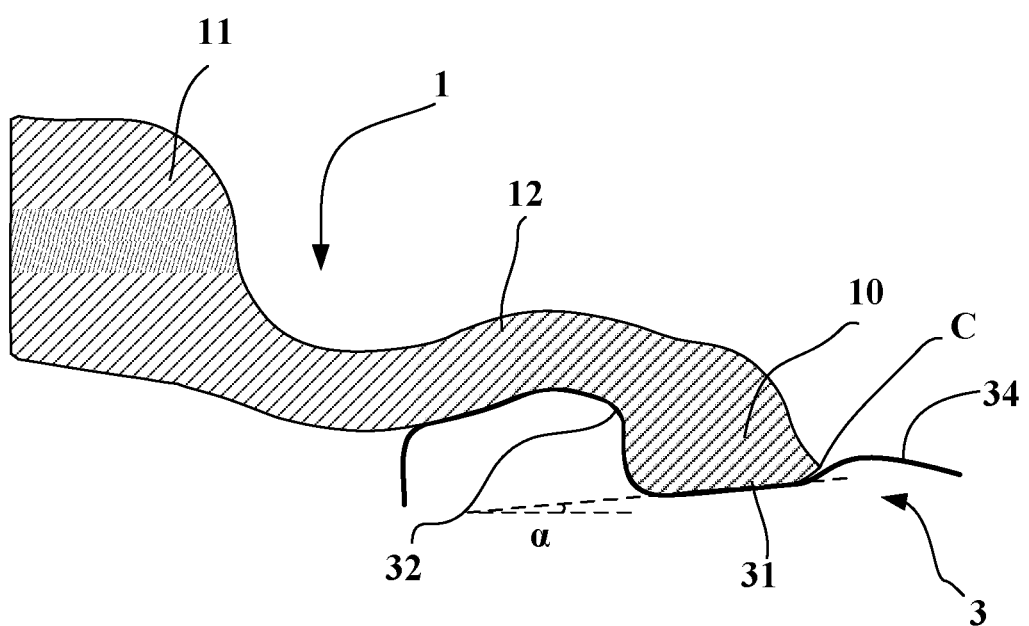
FIG. 5 presents a partial meridian cross section through another embodiment of a rim and of an adapter mounted on the rim according to the invention.

FIG. 5 presents the outer contour of a rim 3 with a boss 34, a rim seat 31 and a rim flange 32. A flexible adapter 1 is mounted on this outer rim contour and is shown in the deformed state. The boss on the radially outer face of the body 12 can in particular be seen, which boss is linked to the shape of the bearing face of the rim flange 32. This embodiment of the rim 3 is such that the rim seat 31 is frustoconical, with an angle of inclination a that is equal in this embodiment to +5°. This inclination of the rim seat that is opposite that of conventional rim seats opposes axial movement towards the inside of the rim after mounting of the flexible adapter on the rim. It is desirable not to increase the inclination of the rim seat beyond 6° due to the greater difficulty in putting the adapter bead in place when this inclination increases.

The rim and adapter assembly according to the invention therefore makes it possible to very substantially improve the behaviour of the rolling assembly during running, while maintaining all the other properties of this rolling assembly intact, in particular a very good impact resistance capacity. The invention also extends to the rim itself, appropriate for use thereof in an assembly as described in the present document. Such a rim, with axis of rotation DD', has a mounting well that is extended axially at least on one side of the median plane by a boss, a substantially frustoconical rim seat, and a rim flange that extends the rim seat axially on the outside and is intended to receive an adapter, characterized in that the rim seat is substantially frustoconical and has an inclination α relative to the axis of rotation DD' of between −2 and +6 degrees, the angle α being counted as positive when the virtual vertex S of the substantially frustoconical seat is situated axially on the outside.

The invention claimed is:
1. An assembly of a rim and of a flexible adapter, configured to make up, with a tyre, a rolling assembly, the rim having an axis of rotation and a median plane, the rim having a mounting well that is extended axially at least on one side of the median plane by:
  a boss;
  a rim seat; and
  a rim flange that extends the rim seat axially on the outside, the rim flange having a first portion defining a bearing face and oriented substantially in a plane perpendicular to the axis of rotation of the rolling assembly and situated radially on the outside relative to the rim seat, a second, substantially frustoconical portion, which is situated axially on the outside relative to the first portion and situated at least in part radially on the outside relative to the rim seat, and a connection portion between the first portion and the second portion;
  wherein the rim seat has a substantially cylindrical portion that is extended axially on the inside by a connection zone with the boss and is extended axially on the outside by a connection zone with the rim flange;
  the adapter having:
  an axially inner end defining an inner adapter bead configured to rest on the rim seat;
  an axially outer end; and
  a substantially cylindrical body that connects the axially inner end and the axially outer end and is configured to receive, in cooperation with the axially outer end, a tyre bead;
  wherein the rim seat of the rim has an inclination relative to the axis of rotation of between −2 and +6 degrees;
  wherein the axially inner end having a first positioning face substantially perpendicular to the axis of rotation, and a substantially cylindrical second positioning face; and
  wherein during mounting of the adapter on the rim seat the second positioning face of the adapter is configured to undergo a contraction which presses the first positioning face of the adapter against the bearing face of the rim flange whereby the inner adapter bead is in a definitive position on the rim seat and can no longer move axially once mounted on the rim.

2. The assembly according to claim 1, wherein the rim seat has an inclination of between +4 and +6 degrees.

3. The assembly according to claim 1, wherein the axial width between the bearing face of the rim flange and the circle of maximum diameter of the boss of the rim is less than 17 mm.

4. The assembly according to claim 1, wherein the axial width between the bearing face of the rim flange and the circle of maximum diameter of the boss of the rim is between 15 and 16 mm.

5. The assembly according to claim 1, wherein an axial width of the rim seat is smaller than an axial width of the inner end of the adapter, which width is measured when the adapter is in a free state.

6. The assembly according to claim 1, wherein the radially inner face of the inner end of the adapter has an axial width smaller than an axial width of the rim seat of the rim, which width is measured when the adapter is in a free state.

7. The assembly according to claim 1, wherein the second portion of the rim flange includes two frustoconical portions.

8. The assembly according to claim 1, wherein the second portion of the rim flange includes two frustoconical portions, the first with an angle of 15° followed axially on the outside by the second with an angle of 5°.

* * * * *